(12) United States Patent
Pickering et al.

(10) Patent No.: US 7,489,334 B1
(45) Date of Patent: Feb. 10, 2009

(54) METHOD AND SYSTEM FOR REDUCING THE COST OF SAMPLING A MOVING IMAGE

(75) Inventors: John B. Pickering, Winchester (GB); Philip G. Wiloughby, Southampton (GB); George M. Blue, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/955,174

(22) Filed: Dec. 12, 2007

(51) Int. Cl.
*H04N 7/18* (2006.01)
*G06K 9/00* (2006.01)

(52) U.S. Cl. ........................... 348/155; 382/133
(58) Field of Classification Search ................ 348/155; 375/240.01; 345/422; 342/22; 382/133
See application file for complete search history.

(56) References Cited

U.S. PATENT DOCUMENTS

| | | | |
|---|---|---|---|
| 3,988,533 | A | 10/1976 | Mick et al. |
| 4,015,366 | A | 4/1977 | Hall, III |
| 4,081,830 | A | 3/1978 | Mick et al. |
| 4,257,063 | A | 3/1981 | Loughry et al. |
| 4,337,481 | A | 6/1982 | Mick et al. |
| 4,417,306 | A | 11/1983 | Citron et al. |
| 4,679,077 | A | 7/1987 | Yuasa et al. |
| 5,669,387 | A | 9/1997 | Mine |
| 5,912,822 | A | 6/1999 | Davis et al. |
| 5,930,379 | A | 7/1999 | Rehg et al. |
| 5,995,095 | A | 11/1999 | Ratakonda |
| 6,057,847 | A * | 5/2000 | Jenkins ........................ 345/422 |
| 6,256,046 | B1 | 7/2001 | Waters et al. |
| 6,603,503 | B1 | 8/2003 | Ribera et al. |
| 6,967,612 | B1 * | 11/2005 | Gorman et al. ............... 342/22 |
| 7,016,537 | B2 | 3/2006 | Cooper |
| 7,114,383 | B2 | 10/2006 | Byrne |
| 7,289,215 | B2 | 10/2007 | Spady et al. |
| 7,317,759 | B1 * | 1/2008 | Turaga et al. .......... 375/240.01 |
| 2002/0054210 | A1 | 5/2002 | Glier et al. |
| 2002/0191828 | A1 | 12/2002 | Colbert et al. |
| 2003/0209893 | A1 | 11/2003 | Breed et al. |
| 2005/0105772 | A1 | 5/2005 | Voronka et al. |
| 2005/0131607 | A1 | 6/2005 | Breed |
| 2005/0275721 | A1 | 12/2005 | Ishii |

(Continued)

FOREIGN PATENT DOCUMENTS

EP 0867839 3/1995

(Continued)

OTHER PUBLICATIONS

Atrey, P.K., et al., "Experiential Sampling based Foreground/Background Segmentation for Video Surveillance,"Multimedia and Expo, 2006 IEEE International Conference, Date: Jul. 9-12, 2006, pp. 1809-1812.

(Continued)

*Primary Examiner*—Gims S Philippe
(74) *Attorney, Agent, or Firm*—Scully, Scott, Murphy & Presser, P.C.; Jeanine S. Ray-Yarletts, Esq.

(57) ABSTRACT

An energy-efficient and cost-reducing method and system to enable the successful sampling of a moving image are disclosed. The method and system use movement detection and analysis within a feedback loop to control subsequent sensor movement/lighting/radiation for control of future sampling of the image.

2 Claims, 2 Drawing Sheets

U.S. PATENT DOCUMENTS

| | | |
|---|---|---|
| 2006/0204057 A1 | 9/2006 | Steinberg |
| 2006/0227997 A1 | 10/2006 | Au et al. |
| 2006/0251293 A1 | 11/2006 | Piirainen et al. |
| 2008/0056570 A1 | 3/2008 | Williams et al. |

FOREIGN PATENT DOCUMENTS

| | | |
|---|---|---|
| EP | 0872808 | 4/1998 |
| WO | WO 98/11734 | 9/1997 |
| WO | WO 98/10370 | 3/1998 |
| WO | WO 03/077552 A1 | 9/2003 |
| WO | WO 2005/050972 A2 | 6/2005 |
| WO | WO 2006/085960 | 6/2005 |
| WO | WO 2006/074328 A2 | 7/2006 |
| WO | WO 2007/054742 | 11/2006 |

OTHER PUBLICATIONS

Cvetkovic, S., et al., "Background Estimation and Adaptation Model with Light-Change Removal for Heavily Down-Sampled Video Surveillance Signals," Image Processing, 2006 IEEE International Conference, Oct. 8-11, 2006, pp. 1829-1832.

Kumar, P., et al., Foreground Background Segmentation Using Temporal and Spatial Markov Processes, Nov. 6, 2000, pp. 1-30.

Pless, R., et al., "Detecting Independent Motion: The Statistics of Temporal Continuity," Pattern Analysis and Machine Intelligence, IEEE Transactions, vol. 22, Issue 8, Aug. 2000, pp. 768-773.

Wang, J., et al., "Experiential Sampling for video surveillance," International Multimedia Conference, First ACM SIGMM international workshop on Video surveillance, pp. 77-86, no date.

Wang, Jie, et al., "Feature selection for subject identification in surveillance photos [face recognition applications]," Image Processing, 2004. ICIP '04. 2004 International Conference, vol. 1, Oct. 24-27, 2004, pp. 71-74, vol. 1.

Nilsson J., "Visual Landmark Selection and Recognition for Autonomous Unmanned Aerial Vehicle Navigation", Master'Degree Project, Royal Institute of Technology, Sweden 2005.

* cited by examiner

METHOD AND SYSTEM FOR REDUCING THE COST OF SAMPLING A MOVING IMAGE

BACKGROUND OF THE INVENTION

1. Fields of the Invention

The present invention relates generally to surveillance systems and more particularly to an image sensor, a motion image sensor, and improved, cost-effective image analysis and motion image analysis methods.

2. Description of the Prior Art

Generally, in many imaging systems implemented for detecting moving objects in an image field, there is a cost associated with sampling parts of the image. This cost includes but is not limited to:

a. A cost in energy in irradiating the subject, e.g. electricity bill for lighting;

b. A cost in damaging the subject, for instance, high exposure to X-rays with fluoroscopy;

c. A cost in being detected, which might apply in certain security applications, where it is desired to want someone not to know if they are being observed;

d. A cost in sensor time where the sensor has to be physically moved, and hence time is wasted by sampling uninteresting areas; and, e. A cost in sensor time where an image sensor device requires time to reset between sampling.

In any moving image, there are typically areas of interest and areas that are not of interest. Traditional imaging systems expend the same amount of cost to sample all areas of the image. When an image comes to be stored on a non-volatile medium, the moving image will typically be compressed. Compression reduces the amount of data to be stored, but it does not remove the cost of making the image in the first place.

Jonas Nilsson in the work entitled "Visual Landmark Selection and Recognition for Autonomous Unmanned Aerial Vehicle Navigation"—Master's degree project, The Royal Institute of Technology, Sweden, 2005, (hereinafter Nilsson)—disclosed image analysis methods that aim at enhancing the performance of a navigation system for an autonomous unmanned aerial vehicle. Nilsson investigates algorithms for the selection, tracking and recognition of landmarks based on the use of local scale invariant features. For example, Nilsson disclosed the affine tracker algorithm combined with Kalman filters to track an object in an image plane. Nilsson further discloses a landmark recognition algorithm that has the capability of recognizing landmarks despite the presence of noise and significant variation in scale and rotation. The performance of the landmark recognition algorithm allows for a substantially reduced sampling rate but the uncertainty of the landmark location results in larger image search areas and therefore an increase in the computational burden. That means the landmark recognition algorithm is more suitable for stable (i.e. unchanging) image regions than for unstable (i.e. changing) image regions.

Therefore, it would be highly desirable to provide a system and method for minimizing the cost in monitoring a visual space (i.e. everything that a camera sees).

SUMMARY OF THE INVENTION

The present invention is directed to a system and method for minimizing image sampling costs in monitoring an area, e.g. visual space. The system and method utilize motion detection and estimation techniques within a feedback loop to control the subsequent sampling method.

In the method of the invention, the following steps are performed:

a. Obtaining image frames and feeding the image frames to a computer to be analyzed.

b. The computer uses image analysis software to identify an area of interest and areas that might become of interest. This may be done by comparing a number of frames against a threshold value or against a reference frame. These could be, for example, areas within the visual space where movement has been detected.

c. The computer provides information to the imaging system that allows it to optimize how future frames are sampled in such a way as to reduce the cost.

d. Repeating the operations in the steps a to c.

In one embodiment, the present invention includes a system to reduce a cost of sampling a moving image comprising:

an image capturing device for monitoring a datastream to collect digital image frames of a visual space according to a low-cost image sampling mode of operation;

an image buffer for storing a plurality of digital image frames from the datastream;

an image processing device for identifying whether there are moving objects in the plurality of digital image frames within the datastream by performing one or more motion detection techniques, and generating detected motion data;

an image processing unit for comparing the digital image frames within the datastream against a threshold value to identify a motion change between the digital image frames, the motion change represents a detection of object movement in the visual space, and generating associated data representing the detection; and a configuration device to configure the image capturing device to switch dynamically between a high-cost image sampling mode of operation and the low-cost image sampling mode of operation based on the associated data and the detected motion data, wherein the high-cost image sampling mode comprising one or more of: zooming in on an identified priority object, increasing a resolution of obtained images, increasing a sampling rate in capturing images, increasing an illumination of the identified priority object, and increasing an irradiation of the identified priority object.

In another embodiment, the present invention includes a method for minimizing costs associated with use of an image sensor device comprising:

(a) monitoring a visual space using the image sensor device in a low-cost sampling mode of operation and generating monitored frames using the low-cost sampling method;

(b) providing a datastream including the monitored frames to a computer device to be analyzed;

(c) performing a motion estimation technique, checking for frame-to-frame change within the datastream to determine an object movement in the visual space, and establishing object priority and sensitivity to identify an area of interest within the visual space based on the object movement; and (d) when the area of interest is identified by the low-cost sampling method, replacing the low-cost sampling method by a high-cost sampling method to monitor and analyze the identified area of interest closely and generating monitored frames using the high-cost sampling method on the identified area of interest, the high-cost sampling method comprising one or more of: zooming in on an identified priority object, increasing a resolution of obtained images, increasing a sampling rate in capturing images, increasing an illumination of the identified priority object, and increasing an irradiation of the identified priority object.

Both the foregoing general description and the following detailed description are exemplary and explanatory only and are not restrictive of the invention as claimed.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
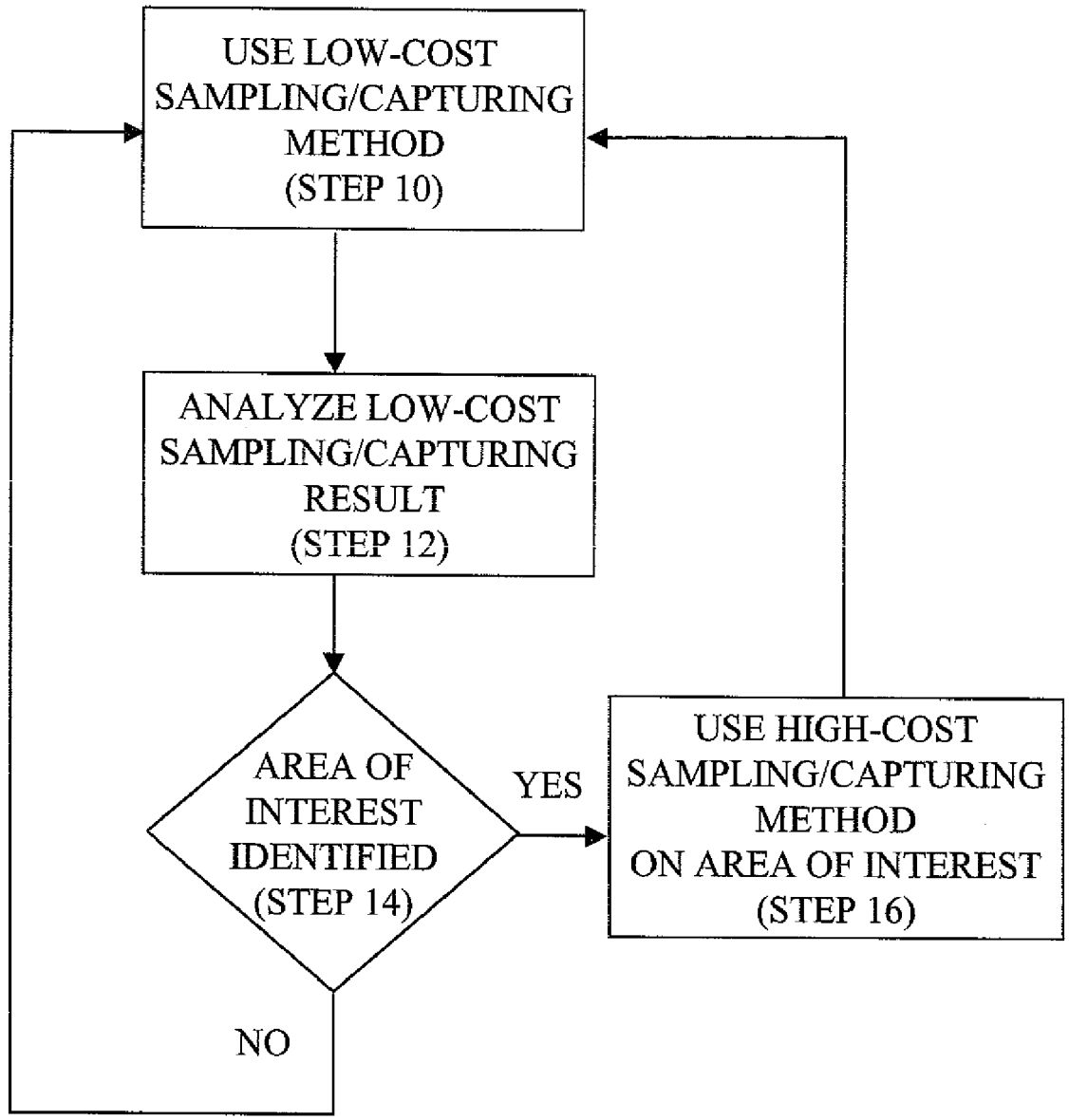
FIG. 1 shows a basic process flow of the present invention.

FIG. 1 provides an overview of the novel system and technique for controlling the sampling method. As shown in FIG. 1, at the first step 10, a low-cost sampling capture method is employed. "Low-cost" here refers to the reduced energy consumption of an imaging system and/or the reduced output radiation level of an imaging system. This method, for instance, may employ a low-resolution, black-and-white camera for image sampling. Successive frames are captured and stored in a memory storage device associated with a computer system. At step 12, the images are examined to establish what can be inferred about the image content using the low-cost sampling approach. This will be expanded in further detail hereinbelow in FIG. 2. Such analysis decides whether or not a significant change of image content has been identified as indicated at step 14. At step 14, a determination is made from the image content as to whether an area of interest (i.e. an area showing an object movement) has been identified. If not, then image capture continues using the low-cost method. If, on the other hand, there are areas of interest identified at step 14, then image capture is dynamically switched to use a high-cost sampling method as shown at step 16. "High-cost" here refers to increasing an image sampling rate, zooming in on an identified priority object, increasing a resolution of obtained image, increasing an illumination of the identified priority object, increasing an irradiation of the identified priority object, and/or using image enhancement technologies such as the use of color and differentiation techniques. The general loop at step 10 to step 14/16—capturing/sampling one or more images, examining them to identify the presence or absence of useful or interesting information, optional image capture/sample settings modification, and image capture/sample again—is repeated indefinitely until no more image capture/sample is required.

Figure 2:
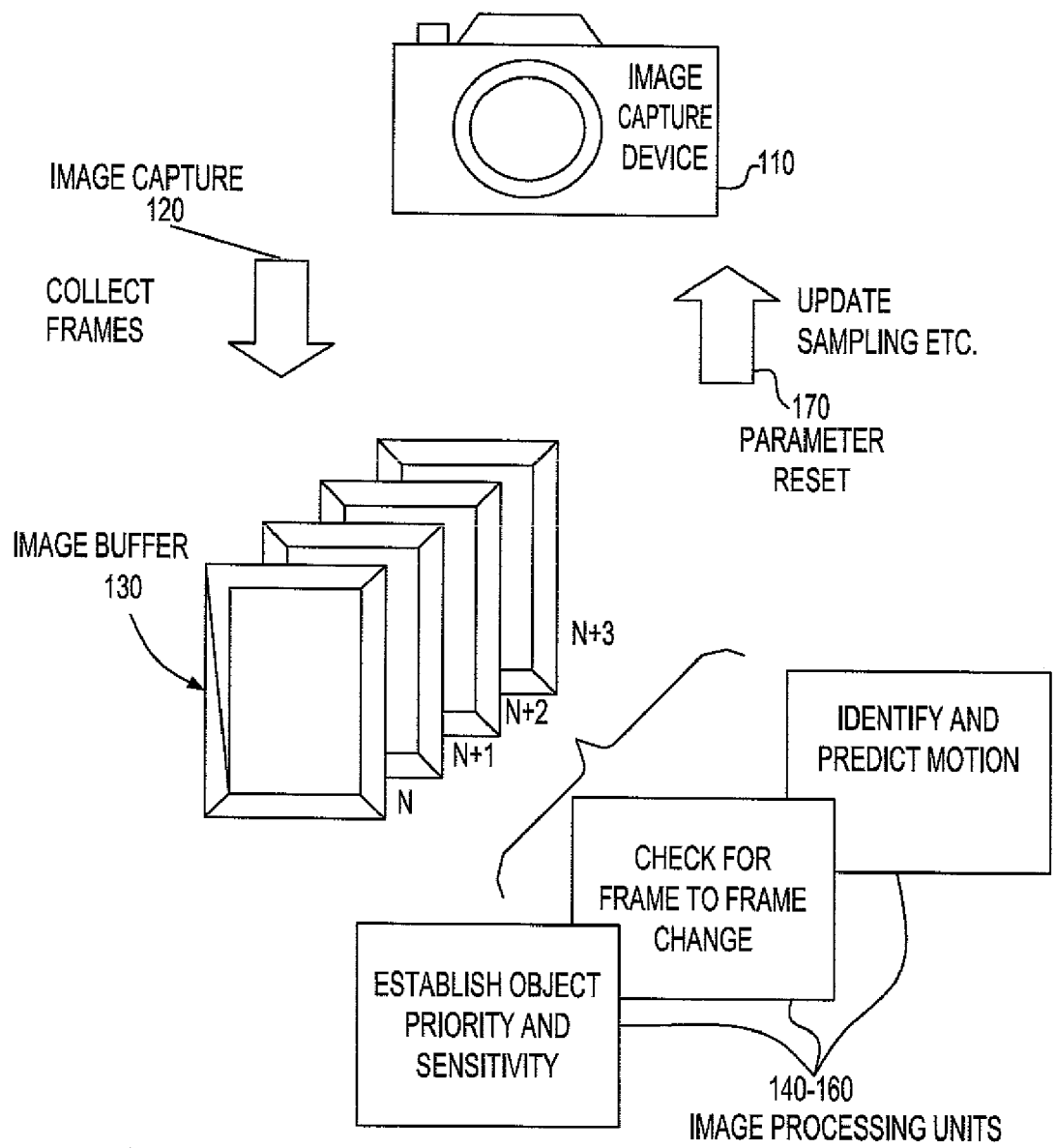
FIG. 2 shows a detailed overview of the process steps employed by the invention.

FIG. 2 depicts a more detailed process flow diagram depicting the examination stage of the process. An image capture device 110 such as a camera, a digital camera, a video recorder, a CCD (Charge-Coupled Device) camera, and the like is used which collects digital images and which can be configured for the following:

sampling rate: that is how often an image is captured (frequency); and image resolution (the number of pixels, for example, to a given physical area);

radiation: that is the intensity of image capture (light saturation; X-Ray dosage; level of exposure; and so forth); and focus: whether or not an image is to be taken zooming in on or zooming out from a specific area.

Images are captured by an image capture device 110 at step 120 and passed on to a central processing device (not shown). This may comprise a continuous datastream of images in, for instance, a surveillance system; where other technology is deployed (such as motion detectors), then image capture may be disabled and (re)-enabled as appropriate. In the latter case where the image capture is (re)-enabled, at startup, then a set of images may first need to be collected to bootstrap the process.

As images are captured and passed to the central processing device, they are stored in an image buffer as shown at step 130 so that they can be compared with each other as detailed below by the image processing modules 140 to 160 where, at module 140, object priority and sensitivity is established; at module 150, frame to frame changes (i.e., comparing the Nth frame with the N−1th frame within a datastream) are checked; and, at module 160, motion is identified and/or predicted.

Any surveillance system using visual imaging will be able to establish what the background is and to have variants of this background to accommodate changes such as may be caused by weather and time of day. Using this background information, it is possible to establish (through image subtraction) areas in the image, which need more attention, because they show priority additions to the image.

More particularly, the image is automatically reviewed at step 140 to identify whether there are animated objects in the frame, or objects which may be particularly sensitive to light or radiation of any type. This may be performed using one or more motion detection techniques, including but not limited to standard edge detection and texture analysis techniques. The edge detection establishes which part of visual spaces belongs to the same object. Texture detectors are used to establish a texture (such as smooth, rough, soft, hard, etc) of the object. Based on the edge detection and texture analysis, the object is identified in a rough term as, for example, a bird, a person, a car, etc. Based on the rough identification, a determination is made as to whether the object is animate or inanimate. A decision on whether the sensitivity of surveillance needs to be increased or not is decided based on the animate/inanimate distinction (i.e., is more light necessary?; can radiation be applied?). At this stage, information is retained and used in conjunction with the next stages to modify default parameter reset actions 170.

At step 150, a number of frames, (N, N+1 ... N+M) are used to establish whether there are any frame-to-frame changes within a datastream by comparing the frames captured during current monitoring. At the simplest level, this may be a simple delta calculation averaged over the M frames: values above a configurable threshold are identified as containing significant change. The process is then repeated but with localized areas in the images to localize the part or parts of the image which are detected as changing, using one or more motion detection techniques. The amounts of change as well as location are stored and passed on to modify the parameter reset at step 170.

Finally, at step 160, movement is determined and flagged with speed and direction. This can be done by looking at localized differences determined at step 150 where general shape integrity has been maintained between images. Comparing successive images and the progression of a similar shape across the images indicates speed and direction of object movement.

From these analyses, characteristics concerning the nature of objects in the image are determined at module 140; how and where the images are changing are determined at module 150; rate and direction of the change are determined at module 160. Taking these together, the process then determines:

position of local area (i.e., location is determined at module 150; speed and direction used to predict location in next M frames are determined at module 160.)

whether the image capture device should zoom in to a local area (i.e., at module 150, whether location remains static and whether quantity of change is high are checked);

whether to increase illumination and/or irradiation (i.e., at module 140, whether an object can be subject to higher exposure is checked; at module 150, image quality is checked; at module 160, whether rate of change is high is checked.)

Factoring these determinations together enables a re-configuring and/or resetting of the parameters 170 at the image capture device 110 before image capture 120 continues.

In an example implementation, the present invention is used as a security camera system: a camera is used to monitor a visual space for security purposes. During the night, the image is not so clear, so an infrared lamp is provided to illuminate the visual space. It is expensive to illuminate the visual space all night. The present invention can be used to monitor a dark image for movement. A system can be programmed to ignore certain kinds of movement, for instance, traffic on a distant road and to detect abnormal movements. When an abnormal movement is detected, the infrared light is automatically switched on. If the light beam can be steered, then it is pointed at the area of movement. This provides a clearer image of the area where the movement occurred or is occurring. The system may additionally alert a security guard to the availability of an image of probable significance. Should the movement simply have come from an animal, for example, then a picture of the animal is recorded. Should the image be of an unidentified intruder, then the image recorder is well lit and will be of use in identifying the intruder. However, the present invention achieves this without lighting the whole area for the entire night.

Although the embodiments of the present invention have been described in detail, it should be understood that various changes and substitutions can be made therein without departing from the spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded into a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for minimizing costs associated with use of an image sensor device comprising:
    (a) monitoring a visual space using the image sensor device in a low-cost sampling mode of operation and generating monitored frames using the low-cost sampling method;
    (b) providing a datastream including the monitored frames to a computer device to be analyzed;
    (c) performing a motion estimation technique, said motion estimation technique comprising an edge detection technique and a texture analysis;
    (d) based on said edge detection technique and said texture analysis, identifying an object, said edge detection determining which part of the visual space belongs to the object, said texture analysis determining a texture of the object;
    (e) based on said identifying said object, determining whether the object is animate or inanimate;
    (f) checking for frame-to-frame change within the datastream to determine a movement of said object in the visual space;
    (g) based on the object movement and the determination of whether the object is animate or inanimate, establishing object priority and sensitivity to identify an area of interest within the visual space; and
    (h) when the area of interest is identified by the low-cost sampling method, replacing the low-cost sampling method by a high-cost sampling method to monitor and analyze the identified area of interest closely and generating monitored frames using the high-cost sampling method on the identified area of interest, the high-cost sampling method comprising one or more of: zooming in on an identified priority object, increasing an illumination of the identified priority object, and increasing an irradiation of the identified priority object.

2. A system to reduce a cost of sampling a moving image comprising:

an image capturing device for monitoring a datastream to collect digital image frames of a visual space according to a low-cost image sampling mode of operation;

an image buffer for storing a plurality of digital image frames from the datastream;

an image processing device for identifying whether there are moving objects in the plurality of digital image frames within the datastream by performing one or more motion detection techniques, said motion detection technique comprising an edge detection technique and a texture analysis, said image processing device for identifying an object based on the edge detection technique and the texture analysis, said edge detection determining which part of the visual space belongs to the object, said texture analysis determining a texture of the object, and said image processing device for determining whether the object is animate or inanimate based on said identifying said object;

an image processing unit for comparing the digital image frames within the datastream against a threshold value to identify a motion change between the digital image frames, the motion change represents a detection of object movement in the visual space, and establishing object priority and sensitivity to identify an area of interest within the visual space, based on the identified motion change and the determination of whether the object is animate or inanimate; and a configuration device for configuring the image capturing device to switch dynamically from the low-cost image sampling mode of operation to a high-cost image sampling mode of operation when the area of interest is identified by the low-cost image sampling mode of operation, wherein the high-cost image sampling mode comprising one or more of: zooming in on an identified priority object, increasing an illumination of the identified priority object, and increasing an irradiation of the identified priority object.

* * * * *